United States Patent [19]
Ohmi et al.

[11] Patent Number: 6,145,888
[45] Date of Patent: Nov. 14, 2000

[54] PIPE JOINT WITH INSPECTION WINDOW

[75] Inventors: Tadahiro Ohmi, Sendai; Michio Yamaji, Osaka; Nobukazu Ikeda, Osaka; Tsutomu Shinohara, Osaka; Tetsuya Kojima, Osaka, all of Japan

[73] Assignee: Fujikin Incorporated, Osaka, Japan

[21] Appl. No.: 08/441,989

[22] Filed: May 16, 1995

[30] Foreign Application Priority Data

Jul. 11, 1994 [JP] Japan .................................. 6-158907

[51] Int. Cl.⁷ .................................................. F16L 37/14
[52] U.S. Cl. ........................ 285/93; 285/328; 285/917; 285/379; 277/314
[58] Field of Search .............. 285/93, 328, 379, 285/917; 277/314, 317

[56] References Cited

U.S. PATENT DOCUMENTS

| | | | |
|---|---|---|---|
| 4,650,227 | 3/1987 | Babudeil et al. | 285/328 |
| 4,703,957 | 11/1987 | Blenkurn | 285/93 |
| 5,099,888 | 3/1992 | Valls, Jr. . | |
| 5,280,967 | 1/1994 | Varrin, Jr. . | |
| 5,308,124 | 5/1994 | Yamaji et al. | 285/328 |
| 5,366,261 | 11/1994 | Onmi et al. | 285/328 |

FOREIGN PATENT DOCUMENTS

| | | | |
|---|---|---|---|
| 642243 | 6/1962 | Canada | 285/93 |
| 366 789 | 5/1990 | European Pat. Off. . | |
| 52-145817 | 5/1977 | Japan . | |
| 4-083976 | 3/1992 | Japan . | |
| 5141576 | 6/1993 | Japan | 285/328 |
| 5332483 | 12/1993 | Japan | 285/93 |

*Primary Examiner*—Eric K. Nicholson
*Attorney, Agent, or Firm*—Armstrong, Westerman, Hattori, McLeland & Naughton

[57] ABSTRACT

A pipe joint comprises a pair of tubular joint members made of a metal and each having an abutting end face, an annular gasket made of a metal and interposed between the abutting end faces of the respective joint members, a nut joining the joint members together and a retainer holding the gasket to one of the joint members. The joint members are made of stainless steel and silver white. The retainer is made of stainless steel and colored blue so as to be discernible from the joint members. The joint can be checked for the presence of the retainer, accordingly for the presence of the gasket, merely by discerning whether the color seen through an inspection window is blue or silver white.

15 Claims, 1 Drawing Sheet

PIPE JOINT WITH INSPECTION WINDOW

BACKGROUND OF THE INVENTION

The present invention relates to pipe joints.

Pipe joints are already known which comprise a pair of tubular joint members of stainless steel each having an abutting end face, an annular gasket of stainless steel interposed between the abutting end faces of the respective joint members, and a nut joining the joint members together and formed in its side wall with an inspection window at a position corresponding to the abutting end faces of the joint members, the inspection window extending through the nut side wall radially thereof.

The problem which is likely to be experienced with pipe joints of the type described is that the worker forgets to install the gasket, permitting a fluid to leak from the joint as incorporated in piping, so that it is practice to check the joint for the presence of the gasket through the inspection window before the nut is tightened up.

The conventional pipe joint has the problem that since the joint members and the gasket are made of stainless steel, it is difficult to discern whether or not the gasket is provided between the abutting end faces of the two joint members and to recognize the presence of the gasket. Besides stainless steel, aluminum, nickel, titanium and the like metals are used for making the joint members and gasket, whereas the same problem is also encountered with these metals because they are all similarly silver white.

SUMMARY OF THE INVENTION

An object of the present invention is to provide a pipe joint which can be readily checked for the presence of its gasket.

According to a first aspect of the present invention, the invention provides a pipe joint which comprises a pair of tubular joint members made of a metal and each having an abutting end face, an annular gasket made of a metal and interposed between the abutting end faces of the respective joint members, and a nut joining the joint members together and formed in its side wall with an inspection window at a position corresponding to the abutting end faces of the joint members, the inspection window extending through the nut side wall radially thereof, the pipe joint being characterized in that the gasket is colored in a color making the gasket discernible from the joint members.

According to a second aspect of the invention, the invention provides a pipe joint which comprises a pair of tubular joint members made of a metal and each having an abutting end face, an annular gasket made of a metal and interposed between the abutting end faces of the respective joint members, and a nut joining the joint members together and formed in its side wall with an inspection window at a position corresponding to the abutting end faces of the joint members, the inspection window extending through the nut side wall radially thereof, the pipe joint being characterized in that the gasket is held to one of the joint members by a retainer made of a metal, the retainer being colored in a color making the retainer discernible from the joint members.

According to the present invention, stainless steel, titanium, nickel or the like is used as the material of the tubular joint members of these joints.

The term "aluminum," "titanium" or "nickel" as used herein includes alloys of the metal.

Stainless steel, aluminum, titanium or like metal as colored is used as the material for the gasket of the pipe joint in the first aspect of the invention. Among these, stainless steel as colored is preferred from the viewpoint of corrosion resistance, cost, etc.

Stainless steel, aluminum or like metal as colored is used as the material for the retainer of the pipe joint in the second aspect of the invention. Desirable among these is stainless steel as colored in view of corrosion resistance, strength, etc.

The material for the gasket of the pipe joint according to the second aspect of the invention may be stainless steel, aluminum, titanium or like metal which is colored like the gasket material for use in the first aspect or which is not colored.

Suitable methods of coloring stainless steel include a method of forming an oxide film on the surface of the steel to an adjusted thickness of about 100 μm to about 300 μm, and a method of coating the steel with a silicone-modified polyester resin or silicone-modified acrylic resin.

Although the color of the gasket and the color of the retainer are changed suitably in connection with the color of the joint members, the difference between the gasket or retainer and the joint members in color can be satisfactory if the gasket or retainer is discernible from the joint members when viewed through the inspection window with the unaided eye.

The pipe joint according to the first aspect of the invention can be checked for the presence of the gasket merely by discerning whether the color seen through the inspection window is the color of the gasket or the color of the joint members. The presence or absence of the gasket can therefore be recognized readily.

The pipe joint according to the second aspect of the invention can be checked for the presence of the gasket merely by discerning whether the color seen through the inspection window is the color of the retainer or the color of the joint members. This facilitates recognition of the presence or absence of the gasket.

DESCRIPTION OF THE PREFERRED EMBODIMENTS

Embodiments of the invention will be described below with reference to the drawings. In the following description, the terms "right" and "left" are used based on FIG. 1.

Figure 1:
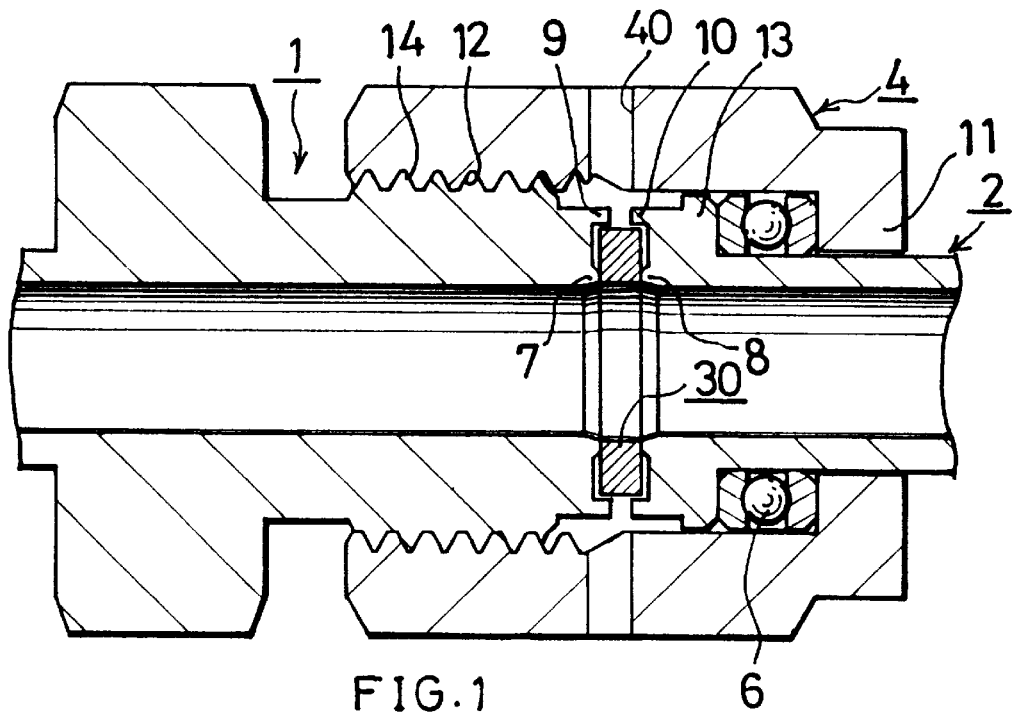
FIG. 1 is a view in longitudinal section of a pipe joint embodying the invention according to a first aspect thereof.

FIG. 1 shows a pipe joint according to the first aspect of the invention. The pipe joint comprises a first tubular joint member 1, a second tubular joint member 2, and an annular gasket 30 interposed between the right end face of the first joint member 1 and the left end face of the second joint member 2. The second joint member 2 is fastened to the first joint member 1 by a nut 4 provided on the member 2 and screwed onto the first member 1.

The two joint members 1, 2 are made of austenitic stainless steel, are not subjected to any coloration treatment and assume a silver white color. The abutting end faces of the respective joint members 1, 2 are formed, each on its inner peripheral portion, with gasket holding annular ridges 7, 8, respectively, and are formed, each on its outer peripheral portion, with overtightening preventing annular projections 9, 10, respectively, which project beyond the ridges 7, 8.

The nut 4 has an inner flange 11 formed at its right end and fitted around the second joint member 2. The nut 4 has at its left end an internally threaded portion 12, which is screwed on an externally threaded right end portion of the first joint member 1. The second joint member 2 has an outer flange 13 on the outer periphery of its left end. A thrust ball bearing 6 is interposed between the outer flange 13 and the inner flange 11 of the nut 4 for preventing the joint member 2 from rotating with the nut 4.

The nut 4 is formed in its side wall with a pair of inspection windows 40 at a position corresponding to the abutting end faces of the joint members 1, 2. The inspection windows 40 are opposed to each other and extend radially of the nut side wall. The inspection windows 40 serve also as helium leak test ports for use in testing the pipe joint for leakage and enable the worker to inspect therethrough the state of the abutting ends of the two joint members 1, 2.

The gasket 30 is made of stainless steel colored blue.

When the interior of the pipe joint as assembled is observed with the eyes through the inspection window 40, the gasket 30 is seen if the joint is assembled normally, whereas if the worker forgets to install the gasket 30, the overtightening preventing annular projections 9, 10 on the abutting end faces of the joint members 1, 2 are seen. Since the gasket 30 is colored blue while the joint members 1, 2 are silver white, the presence or absence of the gasket 30 can be recognized merely by discerning whether the color seen through the inspection window 40 is blue or silver white.

Figure 2:
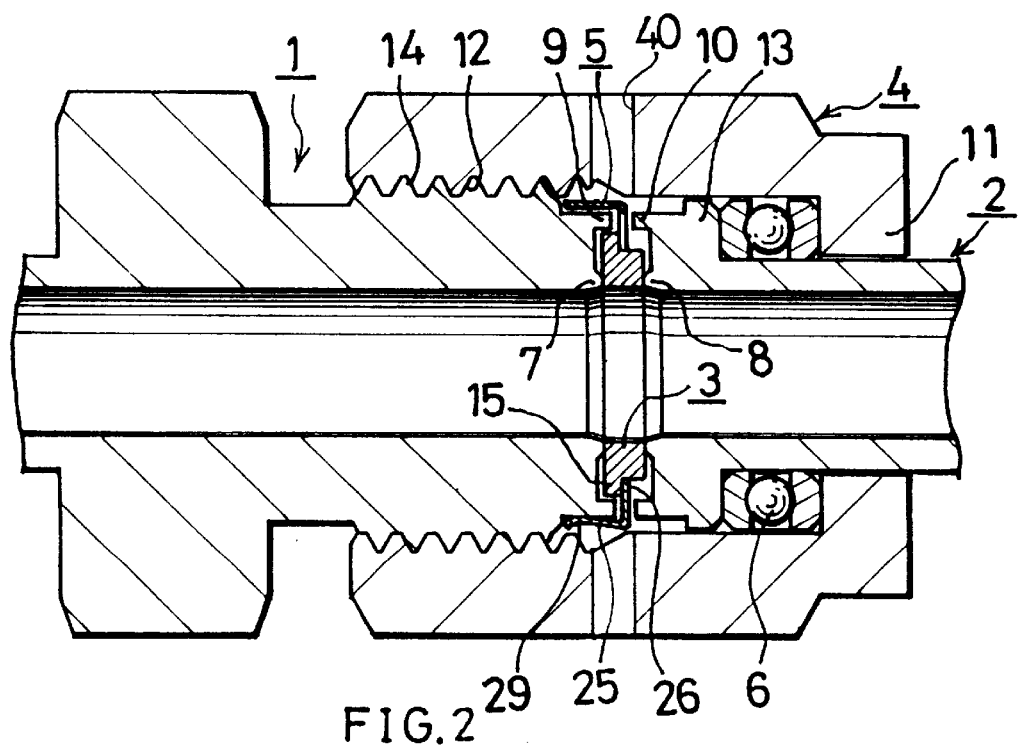
FIG. 2 is a view in longitudinal section of a pipe joint embodying the invention according to a second aspect thereof.

FIG. 2 shows a pipe joint according to the second aspect of the invention. The pipe joint illustrated in the drawing has a retainer 5 held to a first tubular joint member 1 for holding a gasket 3.

The retainer 5 comprises a ring portion 25, a gasket holding portion 26 including claws and inwardly projecting from the right end of the ring portion 25, and a joint member holding portion 29 including claws and engageable with the right end face of the joint member 1. The retainer 5 is made of an integral stainless steel plate which is colored blue.

The gasket 3 is made of nickel, and may be plated with silver when required. Suitable materials for the gasket 3 include austenitic stainless steel, copper and aluminum. These metals may be used as colored when desired. The gasket 3 has on the outer periphery of its left end portion a slipping-off preventing portion 15 in the form of an outer flange and in engagement with the gasket holding portion 26 of the retainer 5. Accordingly, even when the gasket 3 is forced against the retainer 5, this portion 15 prevents the gasket 3 from slipping off the retainer 5 from the right side thereof. This makes it easy for the retainer 5 to hold the gasket 3 thereto or for the joint member 1 to hold the retainer 5 thereto. The gasket 3 is handled always as held to the retainer 5, so that the pipe joint can be checked for the presence of the gasket 3 by checking whether the retainer 5 is present through an inspection window.

When the interior of the pipe joint as assembled is observed with the eyes through the inspection window 40, the retainer 5 is seen if the joint is assembled normally, whereas if the worker forgets to install the retainer 5 having the gasket 3 held thereto, overtightening preventing annular projections 9, 10 provided on the abutting end faces of the two joint members 1, 2 are seen. Since the retainer 5 is colored blue while the joint members 1, 2 are silver white, the presence or absence of the retainer 5, accordingly the presence or absence of the gasket 3, can be recognized merely by discerning whether the color seen through the inspection window 40 is blue or silver white.

What is claimed is:

1. A pipe joint comprising a pair of tubular joint members made of a metal and each having an opposed end face, an annular gasket made of a metal and interposed between the opposing end faces of the respective joint members, and a nut joining the joint members together and formed in said nut's side wall an inspection window at a position radially aligned with the opposing end faces of the joint members the inspection window extending through the nut side wall for viewing said gasket, and the pipe joint being characterized in that the gasket is discernable from the joint members when observed through said inspection window, wherein the gasket is made of stainless steel formed with an oxide film over the surface thereon coloring the gasket.

2. A pipe joint as defined in claim 1 wherein the gasket is coated with a silicone-modified polyester resin or silicone-modified acrylic resin and thereby colored.

3. A pipe joint as defined in claim 1 wherein the tubular joint member is made of stainless steel and the gasket is made of nickel formed with an oxide film over the surface thereon coloring the gasket.

4. A pipe joint as defined in either claim 1 or claim 2 wherein the tubular joint member is made of stainless steel.

5. A pipe joint as defined in claim 1 wherein the gasket is made of aluminum formed with an oxide film over the surface thereon coloring the gasket.

6. A pipe joint as defined in claim 5 wherein the gasket is coated with a silicone-modified polyester resin or silicone-modified acrylic resin and thereby colored.

7. A pipe joint as defined in claim 1 wherein the gasket is made of titanium formed with an oxide film over the surface thereon coloring the gasket.

8. A pipe joint as defined in claim 7 wherein the gasket is coated with a silicone-modified polyester resin or silicone-modified acrylic resin and thereby colored.

9. A pipe joint comprising a pair of tubular joint members made of a metal and each having an opposed end face and an annular gasket made of a metal and interposed between the opposing end faces of the respective joint members, and a nut joining the joint members together and formed in said nut's side wall with an inspection window at a position radially aligned with the opposing end faces of the joint members, the inspection window extending radially through the nut side wall for viewing said opposing end faces of said joint members, and the pipe joint being characterized in that the gasket is held to one of the joint members by a retainer made of a metal, the retainer discernable from the joint members when observed through said inspection window, wherein the retainer is made of stainless steel formed with an oxide film over the surface thereon coloring the gasket.

10. A pipe joint as defined in claim 9 wherein the retainer is coated with a silicone-modified polyester resin or silicone-modified acrylic resin and thereby colored.

11. A pipe joint as defined in either claim 9 or claim 10 wherein the tubular joint member is made of stainless steel.

12. A pipe joint as defined in claim 9 wherein the retainer is made of aluminum formed with an oxide film over the surface thereon coloring the retainer.

13. A pipe joint as defined in claim 12 wherein the retainer is coated with a silicone-modified polyester resin or silicone-modified acrylic resin and thereby colored.

14. A pipe joint comprising a pair of tubular joint members made of a metal and each having an opposed end face, an annular gasket made of a metal and interposed between the opposing end faces of the respective joint members, and a nut joining the joint members together and formed in said nut's side wall an inspection window at a position radially aligned with the opposing end faces of the joint members, the inspection window extending through the nut side wall for viewing said gasket, and the pipe joint being characterized in that the gasket is distinctly colored, by a different color from the original metal color, making the gasket discernable from the joint members when observed through said inspection window.

15. A pipe joint comprising a pair of tubular joint members made of a metal and each having an opposed end face, and an annular gasket made of a metal and interposed between the opposing end faces of the respective joint members, and a nut joining the joint members together and formed in said nut's side wall with an inspection window at a position radially aligned with the opposing end faces of the joint members, the inspection window extending radially through the nut side wall for viewing said opposing end faces of said joint members, and the pipe joint being characterized in that the gasket is held to one of the joint members by a retainer made of a metal, the retainer being distinctly colored, by a different color from the metal original color, making the retainer discernable from the joint members when observed through said inspection window, and the pipe joint can be checked for the presence of the gasket by checking whether the retainer is present through the inspection window.

* * * * *